United States Patent
Ito et al.

(10) Patent No.: US 11,362,344 B2
(45) Date of Patent: Jun. 14, 2022

(54) FUEL CELL AND CELL STACK DEVICE

(71) Applicant: NGK INSULATORS, LTD., Nagoya (JP)

(72) Inventors: Risako Ito, Nagoya (JP); Makoto Ohmori, Nagoya (JP); Hirofumi Kan, Nagoya (JP); Yuki Tanaka, Nagoya (JP); Masayuki Shinkai, Aichi (JP)

(73) Assignee: NGK INSULATORS, LTD., Nagoya (JP)

(*) Notice: Subject to any disclaimer, the term of this patent is extended or adjusted under 35 U.S.C. 154(b) by 146 days.

(21) Appl. No.: 16/560,345

(22) Filed: Sep. 4, 2019

(65) Prior Publication Data

US 2020/0006789 A1   Jan. 2, 2020

Related U.S. Application Data

(63) Continuation of application No. PCT/JP2018/042827, filed on Nov. 20, 2018.

(30) Foreign Application Priority Data

Dec. 13, 2017 (JP) .............................. JP2017-238730

(51) Int. Cl.
*H01M 8/0265* (2016.01)
*H01M 8/2485* (2016.01)
(Continued)

(52) U.S. Cl.
CPC ....... *H01M 8/0265* (2013.01); *H01M 8/2428* (2016.02); *H01M 8/2483* (2016.02);
(Continued)

(58) Field of Classification Search
CPC ............. H01M 8/0265; H01M 8/2483; H01M 8/2485; H01M 8/2484; H01M 8/1226; H01M 8/2428; H01M 2008/1293

See application file for complete search history.

(56) References Cited

U.S. PATENT DOCUMENTS 5,405,712 A * 4/1995 Yoshimura .......... H01M 8/2425
429/433
5,786,105 A   7/1998 Matsushima et al.
(Continued)

FOREIGN PATENT DOCUMENTS

JP   S62-271354 A     11/1987
JP   S62271354 A  *  11/1987
(Continued)

OTHER PUBLICATIONS

Machine Translation of JP-2002208417-A from Espacenet originally published on Jul. 2002 to Yakabe (Year: 2002).*
(Continued)

*Primary Examiner* — Ula C Ruddock
*Assistant Examiner* — Mary Grace Byram
(74) *Attorney, Agent, or Firm* — Flynn Thiel, P.C.

(57) ABSTRACT

A cell stack device includes a manifold and a fuel cell. The manifold includes a gas supply chamber and a gas collection chamber. The fuel cell includes a support substrate and a power generation element portion. The support substrate includes first and second gas channels. The first gas channel is connected to the gas supply chamber, and the second gas channel is connected to the gas collection chamber. The first gas channel is open in the gas supply chamber at a proximal end portion. The second gas channel is open in the gas collection chamber at a proximal end portion. The first and second gas channels are connected to each other on the distal end portion side. The first and second gas channels are configured such that a pressure loss of gas in the first gas channel is smaller than a pressure loss of gas in the second gas channel.

11 Claims, 11 Drawing Sheets

(51) Int. Cl.
*H01M 8/2483* (2016.01)
*H01M 8/2428* (2016.01)
*H01M 8/2484* (2016.01)
*H01M 8/1226* (2016.01)
*H01M 8/12* (2016.01)

(52) U.S. Cl.
CPC ....... *H01M 8/2484* (2016.02); *H01M 8/2485* (2013.01); *H01M 8/1226* (2013.01); *H01M 2008/1293* (2013.01)

(56) References Cited

U.S. PATENT DOCUMENTS

| | | | | |
|---|---|---|---|---|
| 2007/0178359 | A1* | 8/2007 | Peng | H01M 8/1007 429/444 |
| 2007/0298308 | A1* | 12/2007 | Yamamoto | H01M 8/241 429/437 |
| 2020/0144634 | A1 | 5/2020 | Ohara et al. | |

FOREIGN PATENT DOCUMENTS

| | | | | |
|---|---|---|---|---|
| JP | H06-068900 | A | | 3/1994 |
| JP | H09-102323 | A | | 4/1997 |
| JP | 2002-208417 | A | | 7/2002 |
| JP | 2002208417 | A | * | 7/2002 |
| JP | 2005-235418 | A | | 9/2005 |
| JP | 2007-200864 | A | | 8/2007 |
| JP | 2015-053186 | A | | 3/2015 |
| JP | 2016-171064 | A | | 9/2016 |
| JP | 6030259 | B1 | * | 11/2016 ............ H01M 8/247 |
| JP | 2016-207264 | A | | 12/2016 |
| JP | 6239721 | B1 | | 11/2017 |

OTHER PUBLICATIONS

Machine Translation of JP-S62271354-A from Espacenet orginally published on Nov. 1987 to Sakai (Year: 1987).*

Mahcine English translation of JP6030259B1 from Google Patents originally published to Ohmori Nov. 2016 (Year: 2016).*

English translation of International Preliminary Report on Patentability and Written Opinion of the International Searching Authority, issued in corresponding International Application No. PCT/JP2018/042827, dated Jun. 16, 2020 (9 pages).

International Search Report corresponding to PCT/JP2018/042827, In Japanese and English, dated Jan. 29, 2019 (5 pages).

Notification of Transmittal of the International Search Report and Written Opinion of the International Searching Authority corresponding to PCT/JP2018/042827, in Japanese, dated Jan. 29, 2019 (2 pages).

Written Opinion of the International Searching Authority corresponding to PCT/JP2018/042827, in Japanese, dated Jan. 29, 2019 (5 pages).

* cited by examiner

FUEL CELL AND CELL STACK DEVICE

CROSS-REFERENCE TO RELATED APPLICATIONS

This application is a continuation application of PCT/JP2018/042827, filed Nov. 20, 2018, which claims priority to Japanese Application No. 2017-238730, filed Dec. 13, 2017, the entire contents all of which are incorporated hereby by reference.

TECHNICAL FIELD

The present invention relates to a fuel cell and a cell stack device.

BACKGROUND ART

A cell stack device including a fuel cell and a manifold for supplying gas to the fuel cell is known. The fuel cell includes a support substrate and a power generation element portion. The support substrate is provided with a gas channel. The power generation element portion is supported by the support substrate. Fuel gas is supplied from a proximal end portion of the support substrate to the gas channel. Unreacted gas in fuel gas supplied from the proximal end portion of the gas channel of the support substrate is ejected from the distal end portion of the gas channel to the outside.

CITATION LIST

Patent Literature

Patent Literature 1: JP 2016-171064A

SUMMARY

Technical Problem

There is a demand for an improvement in the efficiency of gas usage in a cell stack device as described above. In view of this, the present invention aims to provide a fuel cell and a cell stack device capable of improving the efficiency of gas usage.

Solution to Problem

A fuel cell according to a first aspect of the present invention includes a distal end portion and a proximal end portion. The fuel cell includes a support substrate, at least one power generation element portion, at least one first gas channel, and at least one second gas channel. The power generation element portion is disposed on the support substrate. The first and second gas channels extend from the proximal end portion to the distal end portion in the support substrate. The first and second gas channels are connected to each other in the distal end portion. The first gas channel and the second gas channel are configured such that a pressure loss of gas in the first gas channel is smaller than a pressure loss of gas in the second gas channel.

With this configuration, unreacted gas in gas that has flowed through the first gas channel and is used to generate power in the power generation element portion flows through the second gas channel, instead of being ejected from the distal end portion of the first gas channel to the outside, and thus is used to generate power in the power generation element portion again. Thus, it is possible to improve the efficiency of gas usage.

Note that, if fuel gas flows through the first and second gas channels, problems as described below may arise. That is, fuel gas is consumed in each power generation element portion in a process in which fuel gas flows through the first gas channel and the second gas channel. After fuel gas has flowed through the first gas channel, the fuel gas flows through the second gas channel. Thus, the hydrogen concentration in fuel gas is lower in fuel gas flowing through the second gas channel than in fuel gas flowing through the first gas channel. If the hydrogen concentration in fuel gas decreases and hydrogen required for the power generation element portions is insufficient, an atmosphere at an interface with an electrolyte in a fuel electrode becomes an oxidizing atmosphere. As a result, problems will arise that Ni that is present in the vicinity of the interface changes to NiO, reaction resistance in the vicinity of the interface increases, and the power generation efficiency of this power generation element portion decreases.

In contrast, in the fuel cell according to the present invention, the first gas channel and the second gas channel are configured such that a pressure loss of gas in the first gas channel is smaller than a pressure loss of gas in the second gas channel. With this configuration, the flow velocity of gas flowing through the second gas channel is larger than the flow velocity of gas flowing through the first gas channel. As a result, it is possible to improve gas diffusibility in portions of the power generation element portions to which gas is supplied from the second gas channel and keep Ni that is present in the vicinity of the interface from changing into NiO. Thus, it is possible to inhibit the power generation efficiency of the power generation element portions from decreasing.

Preferably, the sum of a flow channel cross-sectional area of the at least one first gas channel is larger than the sum of a flow channel cross-sectional area of the at least one second gas channel.

A ratio (S1/S2) of the sum (S1) of the flow channel cross-sectional area of the at least one first gas channel to the sum (S2) of the flow channel cross-sectional area of the at least one second gas channel is 1.05 or more.

Preferably, the fuel cell includes a plurality of the first gas channels.

Preferably, the number of first gas channels is larger than the number of second gas channels.

Preferably, a pitch between a first gas channel and a second gas channel that are adjacent to each other is larger than a pitch between first gas channels that are adjacent to each other.

Preferably, the fuel cell includes a plurality of the second gas channels. The flow channel cross-sectional areas of the first gas channels and the flow channel cross-sectional areas of the second gas channels are equal to each other. Also, a pitch between first gas channels and a pitch between second gas channels are equal to each other. This configuration makes it possible to more evenly supply gas to one power generation element portion. Note that the flow channel cross-sectional areas being equal to each other means that the flow channel cross-sectional areas need not be completely the same, and may also include manufacturing errors. Also, the pitch between first gas channels and the pitch between second gas channels being equal to each other means that the pitches need not be completely the same, and may include manufacturing errors.

Preferably, the fuel cell further includes a connection channel. The connection channel is configured to connect at least one first gas channel and at least one second gas channel in the distal end portion of the fuel cell.

Preferably, an inner portion of the support substrate includes the connection channel.

Preferably, the fuel cell further includes a connection member that is attached to a manifold and a distal end portion of the support substrate. An inner portion of the connection member includes the connection channel.

Preferably, the at least one power generation element portion includes a plurality of power generation element portions. The power generation element portions are arranged in a direction in which the first and second gas channels extend.

Preferably, the power generation element portion extends in a width direction of the support substrate. The power generation element portion is divided into a first portion and a second portion in the width direction of the support substrate. The first gas channel overlaps the first portion of the power generation element portion in a thickness view of the support substrate. The second gas channel overlaps the second portion of the power generation element portion in the thickness view of the support substrate.

A cell stack device according to a second aspect of the present invention includes any of the above-described fuel cells and a manifold. The manifold includes a gas supply chamber and a gas collection chamber. The manifold is configured to support a proximal end portion of the fuel cell. The first gas channel is connected to the gas supply chamber. The second gas channel is connected to the gas collection chamber.

A cell stack device according to a third aspect of the present invention includes a manifold and a fuel cell. The manifold includes a gas supply chamber and a gas collection chamber. The fuel cell includes a support substrate and at least one power generation element portion. The support substrate extends from the manifold in a first direction. The power generation element portion is supported by the support substrate. The support substrate includes at least one first gas channel and at least one second gas channel. The first gas channel extends in the first direction and is connected to the gas supply chamber. The second gas channel extends in the first direction and is connected to the gas collection chamber. The first gas channel and the second gas channel each include a proximal end portion located on the manifold side and a distal end portion that is opposite the proximal end portion. The first gas channel is open in the gas supply chamber at the proximal end portion. The second gas channel is open in the gas collection chamber at the proximal end portion. The first gas channel and the second gas channel are connected to each other on the distal end portion side. The first gas channel and the second gas channel are configured such that a pressure loss of gas in the first gas channel is smaller than a pressure loss of gas in the second gas channel.

Advantageous Effects

According to the present invention, it is possible to improve the efficiency of gas usage.

DESCRIPTION OF EMBODIMENTS

Figure 1:
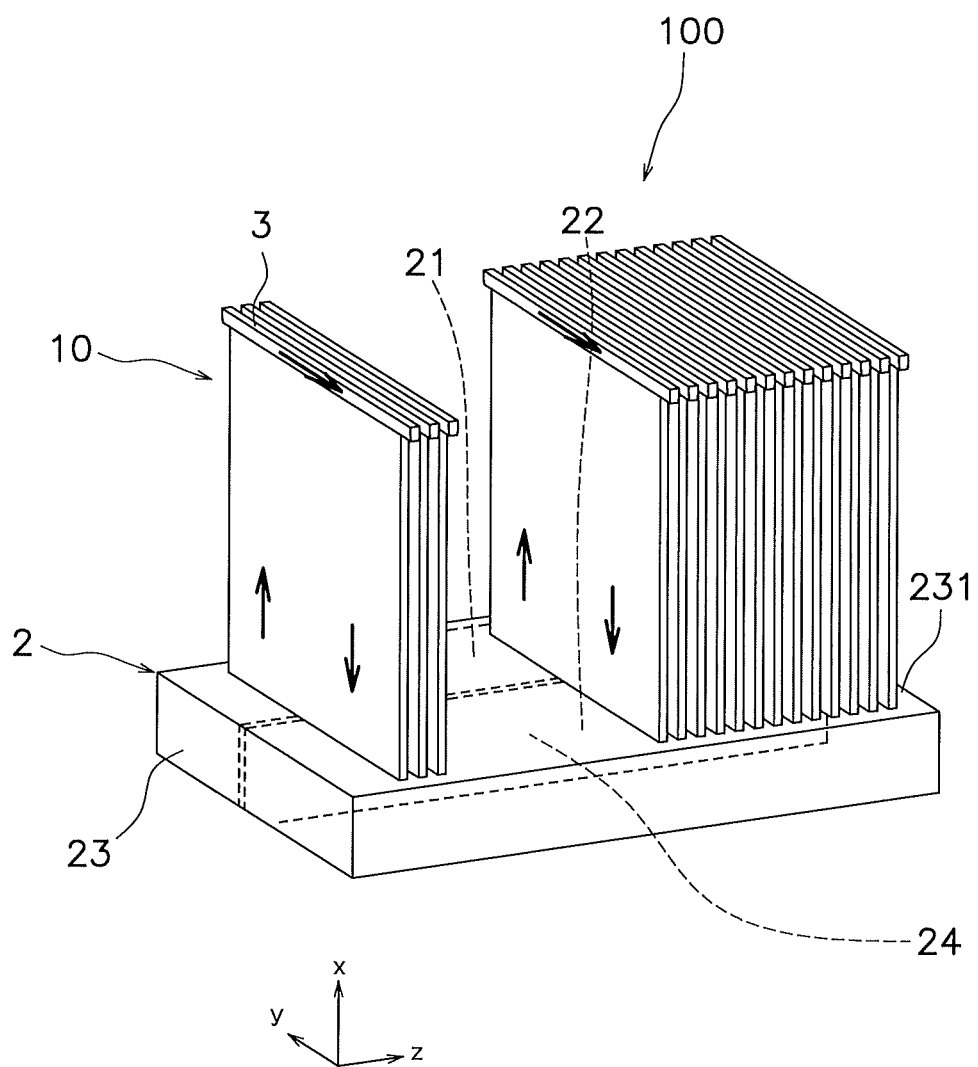
FIG. 1 is a perspective view of a cell stack device.

Hereinafter, embodiments of a fuel cell and a cell stack device according to the present invention will be described with reference to the drawings. FIG. 1 is a perspective view showing a cell stack device. Note that some fuel cells are not shown in FIG. 1. In the following description, proximal and distal positions refer to positions relative to a manifold. For example, a proximal end portion refers to an end portion that is closer to the manifold, and a distal end portion refers to an end portion that is more distant from the manifold.

Cell Stack Device

As shown in FIG. 1, a cell stack device 100 includes a manifold 2, a plurality of fuel cells 10, and a connection member 3.

Manifold

Figure 2:
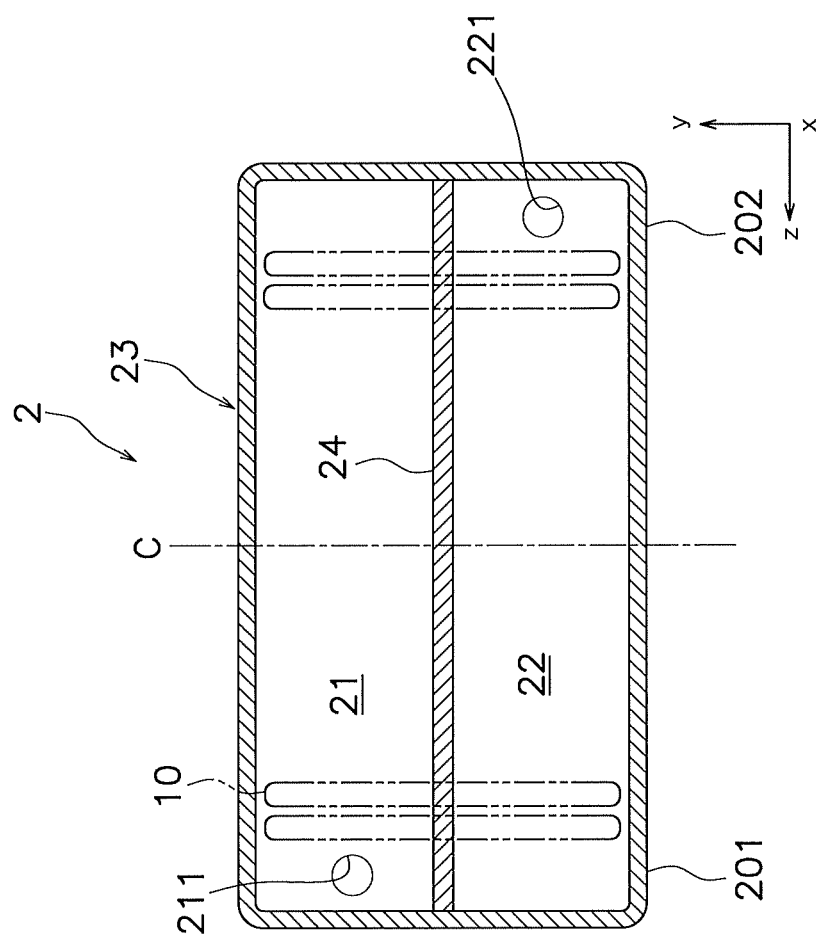
FIG. 2 is a cross-sectional view of a manifold.

As shown in FIG. 2, the manifold 2 is configured to supply gas to the fuel cells 10. Also, the manifold 2 is configured to collect gas ejected from the fuel cells 10. The manifold 2 includes a gas supply chamber 21 and a gas collection chamber 22. Fuel gas is supplied from a fuel gas supply source to the gas supply chamber 21 via a reformer or the like. The gas collection chamber 22 collects offgas from fuel gas used in the fuel cells 10.

The manifold 2 includes a manifold main body 23 and a partition plate 24. The manifold main body 23 has an internal space. The manifold main body 23 has a rectangular parallelepiped shape.

Figure 3:
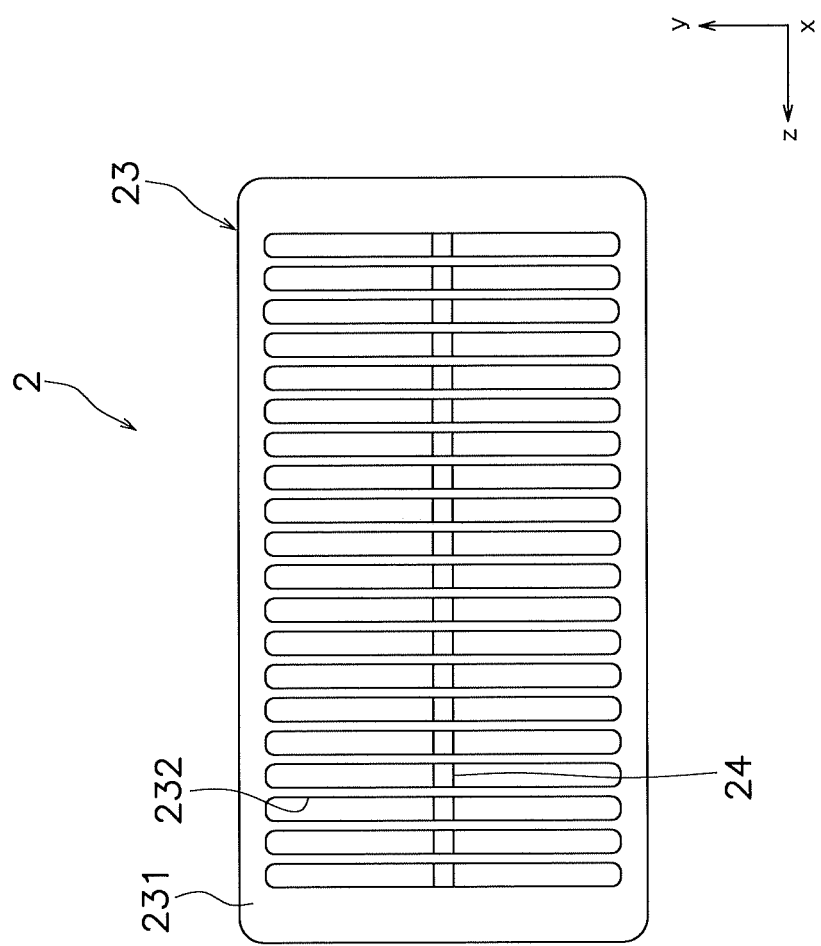
FIG. 3 is a top view of the manifold.

As shown in FIG. 3, an upper plate portion 231 of the manifold main body 23 is provided with a plurality of through holes 232. The through holes 232 are arranged at intervals in a length direction (the Z-axis direction) of the manifold main body 23. The through holes 232 extend in a width direction (the Y-axis direction) of the manifold main body 23. The through holes 232 open into the gas supply chamber 21 and the gas collection chamber 22. Note that each through hole 232 may be divided into a portion that opens into the gas supply chamber 21 and a portion that opens into the gas collection chamber 22.

The partition plate 24 partitions the space of the manifold main body 23 into the gas supply chamber 21 and the gas collection chamber 22. Specifically, the partition plate 24 extends in the length direction of the manifold main body 23 at a substantially central portion of the manifold main body 23. Note that, although the partition plate 24 completely partitions the space of the manifold main body 23 in the present embodiment, a gap may be formed between the partition plate 24 and the manifold main body 23.

As shown in FIG. 2, a bottom surface of the gas supply chamber 21 is provided with a gas supply port 211. Also, a bottom surface of the gas collection chamber 22 is provided with a gas ejection port 221. Note that the gas supply port 211 may be formed in a side surface or an upper surface of the gas supply chamber 21, and the gas ejection port 221 may be formed in a side surface or an upper surface of the gas collection chamber 22.

The gas supply port 211 is disposed on a first end portion 201 side with respect to a center C of the manifold 2 in an arrangement direction (the Z-axis direction) of the fuel cells 10, for example. On the other hand, the gas ejection port 221 is disposed on a second end portion 202 side with respect to the center C of the manifold 2 in the arrangement direction (the Z-axis direction) of the fuel cells 10, for example.

Fuel Cell

Figure 4:
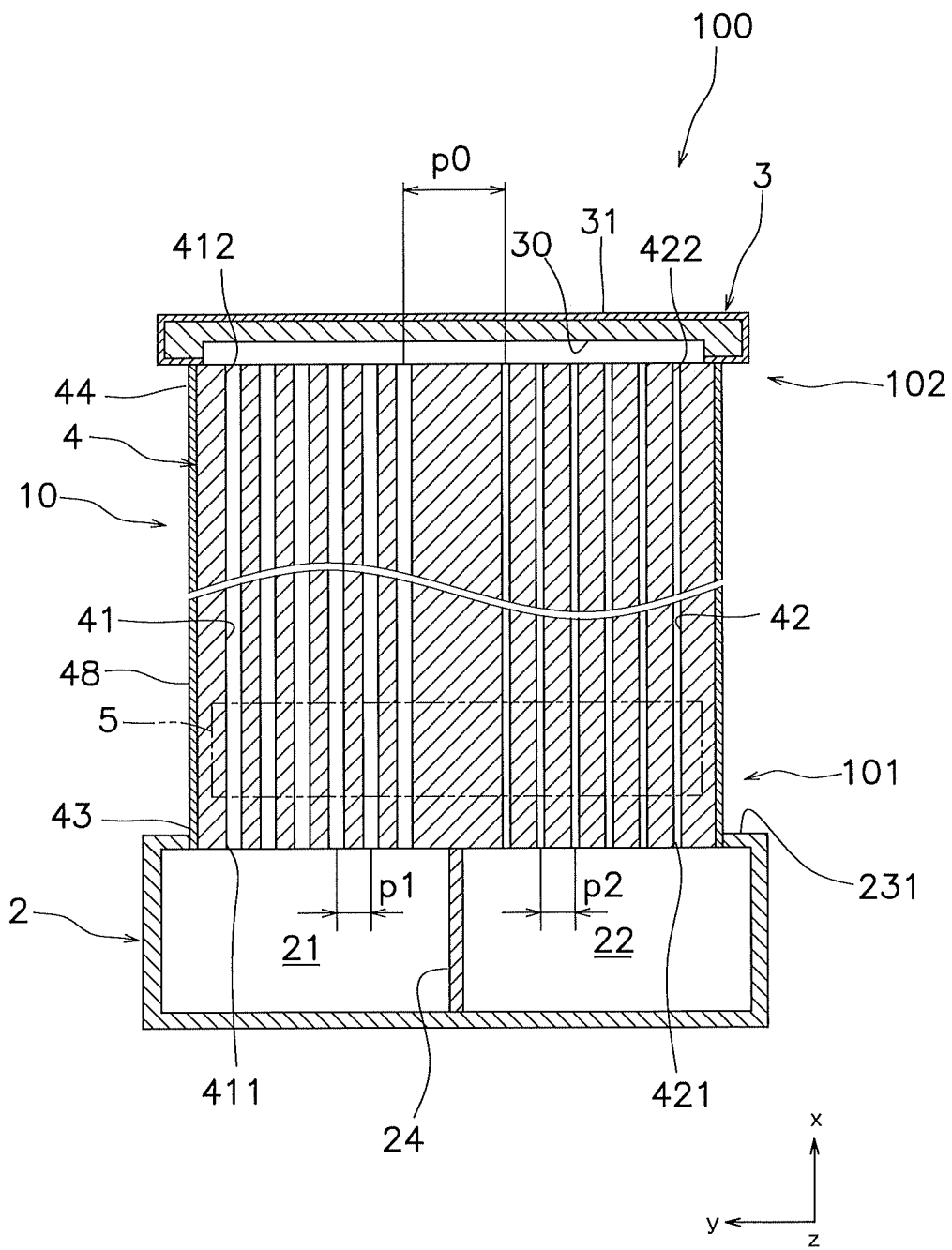
FIG. 4 is a cross-sectional view of the cell stack device.

FIG. 4 is a cross-sectional view of the cell stack device. As shown in FIG. 4, the fuel cell 10 extends upward from the manifold 2. The fuel cell 10 has a proximal end portion 101 and a distal end portion 102. The proximal end portion 101 of the fuel cell 10 is attached to the manifold 2. That is, the manifold 2 supports the proximal end portion 101 of the fuel cell 10. In this embodiment, the proximal end portion 101 of the fuel cell 10 refers to a lower end portion, and the distal end portion 102 of the fuel cell 10 refers to an upper end portion.

As shown in FIG. 1, the fuel cells 10 are arranged such that main surfaces of the fuel cells 10 face each other. Also, the fuel cells 10 are arranged at intervals in the length direction (the Z-axis direction) of the manifold 2. That is, the arrangement direction of the fuel cells 10 is along the length direction of the manifold 2. The fuel cells 10 are disposed at equal intervals in the length direction of the manifold 2 in this embodiment, but the fuel cells 10 need not be disposed at equal intervals.

Figure 5:
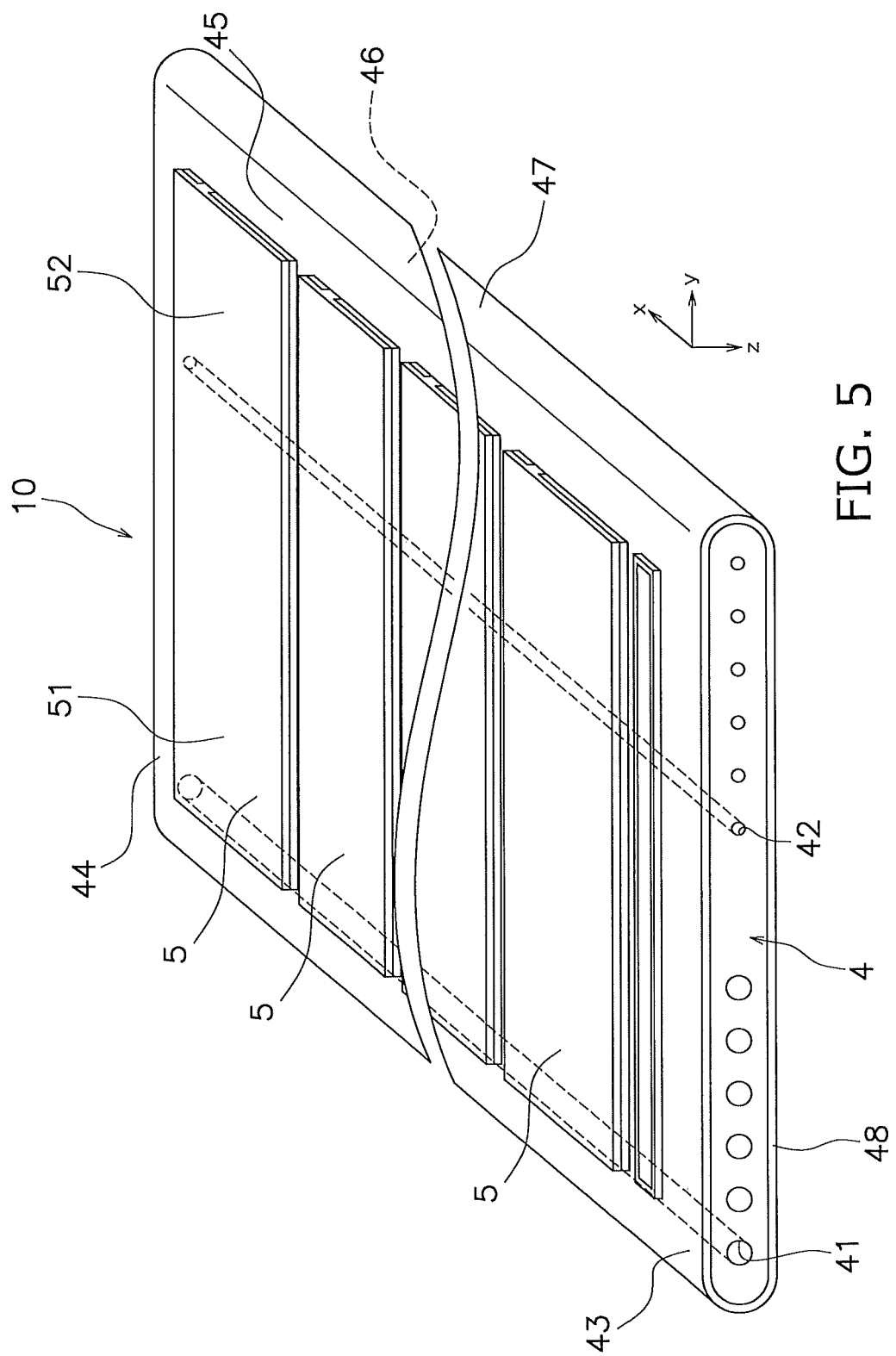
FIG. 5 is a perspective view of a fuel cell.

As shown in FIGS. 4 and 5, the fuel cells 10 each include a support substrate 4, a plurality of first gas channels 41, a plurality of second gas channels 42, and a plurality of power generation element portions 5. Also, the fuel cell 10 includes a connection channel 30.

Support Substrate

The support substrate 4 extends upward from the manifold 2. The support substrate 4 has a flat shape, and has a proximal end portion 43 and a distal end portion 44. The proximal end portion 43 and the distal end portion 44 are both end portions of the support substrate 4 in the length direction (the X-axis direction). In this embodiment, the proximal end portion 43 of the support substrate 4 refers to a lower end portion, and the distal end portion 44 of the support substrate 4 refers to an upper end portion. Although the length of the support substrate 4 in the length direction (the X-axis direction) is longer than the length of the support substrate 4 in the width direction (the Y-axis direction) in this embodiment, the length of the support substrate 4 in the width direction (the Y-axis direction) may be longer than the length of the support substrate 4 in the length direction (the X-axis direction).

The proximal end portion 43 of the support substrate 4 is attached to the manifold 2. For example, the proximal end portion 43 of the support substrate 4 is attached to the upper plate portion 231 of the manifold 2 with use of a bonding material or the like. Specifically, the proximal end portion 43 of the support substrate 4 is inserted into a through hole 232 formed in the upper plate portion 231. Note that the proximal end portion 43 of the support substrate 4 need not be inserted into the through hole.

As shown in FIG. 5, the support substrate 4 includes a first main surface 45 and a second main surface 46. The first main surface 45 and the second main surface 46 face away from each other. The first main surface 45 and the second main surface 46 support power generation element portions 5. The first main'surface 45 and the second main surface 46 are oriented in the thickness direction (the Z-axis direction) of the support substrate 4. Also, side surfaces 47 of the support substrate 4 are oriented in the width direction (the Y-axis direction) of the support substrates 4. The side surfaces 47 may be curved.

The support substrate 4 is constituted by a porous material having no electron conductivity. The support substrate 4 is constituted by CSZ (calcia stabilized zirconia), for example. Alternatively, the support substrate 4 may be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep gas that is diffused from the first gas channels 41 and the second gas channels 42 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 91, which will be described later. The compact layer 48 is more compact than the support substrate 4. For example, the compact layer 48 has a porosity of about 0% to 7%.

First and Second Gas Channels

The plurality of first gas channels 41 and the plurality of second gas channels 42 are formed in the support substrate 4. The first gas channels 41 extend from the proximal end portion 101 toward the distal end portion 102 of the fuel cell 10. The first gas channels 41 extend in the vertical direction in the support substrate 4 in this embodiment. The first gas channels 41 pass through the support substrate 4. The first gas channels 41 are disposed at intervals in the width direction (the Y-axis direction) of the support substrate 4. Note that the first gas channels 41 are preferably disposed at substantially equal intervals.

As shown in FIG. 4, the first gas channels 41 each include a proximal end portion 411 and a distal end portion 412. The proximal end portion 411 of the first gas channel 41 is located on the manifold 2 side in a state in which the fuel cell 10 is attached to the manifold 2. Also, the distal end portion 412 of the first gas channel 41 is an end portion that is opposite the proximal end portion 411. Note that the proximal end portion 411 refers to the lower end portion of the first gas channel 41, and the distal end portion 412 refers to the upper end portion of the first gas channel 41.

The first gas channels 41 are connected to the gas supply chamber 21 of the manifold 2 in a state in which the fuel cell 10 is attached to the manifold 2. That is, the first gas channel 41 is open in the gas supply chamber 21 at the proximal end portion 411.

The second gas channels 42 extend from the proximal end portion 101 toward the distal end portion 102 of the fuel cell 10. The second gas channels 42 extend in the vertical direction in the support substrate 4 in this embodiment. The second gas channels 42 pass through the support substrate 4. The second gas channels 42 are disposed at intervals in the width direction (the Y-axis direction) of the support substrate 4. Note that the second gas channels 42 are preferably disposed at substantially equal intervals.

The second gas channels 42 each include a proximal end portion 421 and a distal end portion 422. The proximal end portion 421 of the second gas channel 42 is located on the manifold 2 side in a state in which the fuel cell 10 is attached to the manifold 2. Also, the distal end portion 422 of the second gas channel 42 is an end portion that is opposite the proximal end portion 421. Note that the proximal end portion 421 refers to the lower end portion of the second gas channel 42, and the distal end portion 422 refers to the upper end portion of the second gas channel 42.

The second gas channels 42 are connected to the gas collection chamber 22 of the manifold 2 in a state in which the fuel cell 10 is attached to the manifold 2. That is, the second gas channel 42 is open in the gas supply chamber 21 at the proximal end portion 421.

A pitch p1 between adjacent first gas channels 41 is about 1 to 5 mm, for example. The pitch p1 between adjacent first gas channels 41 indicates the distance between centers of adjacent first gas channels 41. For example, an average value of pitches obtained by measuring pitches of first gas channels 41 in the proximal end portion 43, the central portion, and the distal end portion 44 of the support substrate 4 may be used as the pitch p1 between first gas channels 41.

A pitch p2 between adjacent second gas channels 42 is about 1 to 5 mm, for example. The pitch p2 between adjacent second gas channels 42 indicates the distance between centers of adjacent second gas channels 42. For example, an average value of pitches obtained by measuring pitches of second gas channels 42 in the proximal end portion 43, the central portion, and the distal end portion 44 of the support substrate 4 may be used as the pitch p2 between second gas channels 42. Note that the pitch p2 between second gas channels 42 is preferably substantially equal to the pitch p1 between first gas channels 41.

A pitch p0 between the first gas channel 41 and the second gas channel 42 that are adjacent to each other is about 1 to 10 mm, for example. The pitch p0 between the first gas channel 41 and the second gas channel 42 that are adjacent to each other indicates the distance between the center of the first gas channel 41 and the center of the second gas channel 42. For example, an average value of pitches obtained by measuring pitches in the proximal end portion 43, the central portion, and the distal end portion 4 of the support substrate 4 may be used as the pitch p0.

The pitch p0 between the first gas channel 41 and the second gas channel 42 that are adjacent to each other is larger than the pitch p1 between adjacent first gas channels 41. Also, the pitch p0 between the first gas channel 41 and the second gas channel 42 that are adjacent to each other is larger than the pitch p2 between adjacent second gas channels 42. This inhibits gas that flows through the first gas channel 41 from flowing through a shorter path to the second gas channel 42 in the support substrate 4.

As a result of making the pitch p0 between the first gas channel 41 and the second gas channel 42 larger than the pitch p1 between first gas channels 41 and the pitch p2 between second gas channels 42 in this manner, the first gas channel 41 and the second gas channel 42 that are adjacent to each other are separated from each other. A region between the first gas channel 41 and second gas channel 42 is referred to as a boundary region 403.

Figure 6:
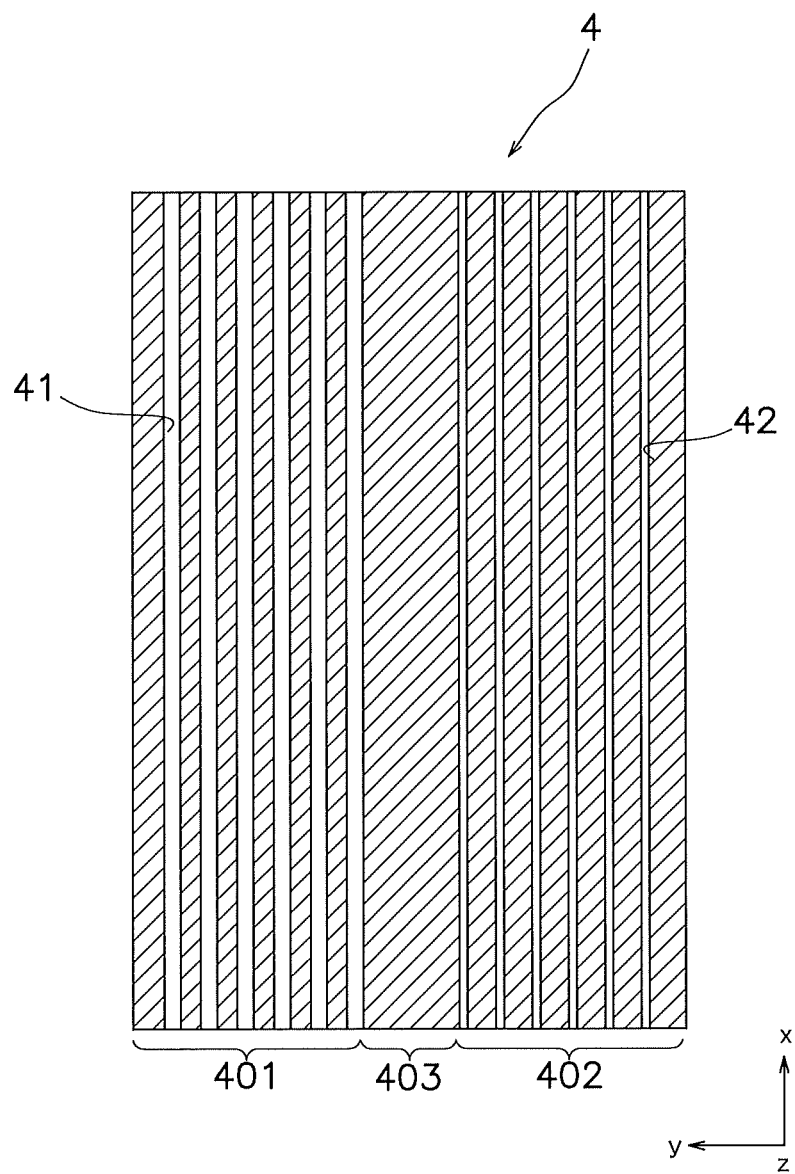
FIG. 6 is a cross-sectional view of a support substrate.

As shown in FIG. 6, the support substrate 4 includes a first region 401, a second region 402, and the boundary region 403. The first region 401, the second region 402, and the boundary region 403 are formed by defining the support substrate 4 in the width direction (the Y-axis direction). The first region 401 is a region in which the first gas channels 41 are formed. The second region 402 is a region in which the second gas channels 42 are formed. The boundary region 403 is a region between the first region 401 and the second region 402. The first region 401 and the second region 402 are separated from each other by the boundary region 403.

The first gas channels 41 and the second gas channels 42 are connected to each other in the distal end portion 102 of the fuel cell 10. That is, the first gas channels 41 and the second gas channel 42 are connected to each other in the distal end portions 412 and 422 thereof. Specifically, the distal end portions 412 of the first gas channels 41 and the distal end portions 422 of the second gas channels 42 are connected to each other via the connection channel 30.

Pressure Loss in First and Second Gas Channels

The first gas channels 41 and the second gas channels 42 are configured such that a pressure loss of gas in the first gas channels 41 is smaller than a pressure loss of gas in the second gas channels 42. Note that, if the number of first gas channels 41 is different from the number of second gas channels 42, the first gas channels 41 and the second gas channels 42 are configured such that the average of the pressure losses of gas in the first gas channels 41 is smaller than the average of the pressure losses of gas in the second gas channels 42.

In this embodiment, the sum of the flow channel cross-sectional areas of the first gas channels 41 is larger than the sum of the flow channel cross-sectional areas of the second gas channels 42. Note that in this embodiment, the flow channel cross-sectional area of each first gas channel 41 is larger than the flow channel cross-sectional area of each second gas channel 42.

A ratio (S1/S2) of the sum (S1) of the flow channel cross-sectional areas of the first gas channels 41 to the sum (S2) of the flow channel cross-sectional areas of the second gas channels 42 is preferably set to 1.05 or more. Also, this ratio (S1/S2) can be set to 3.0 or less.

Note that the flow channel cross-sectional area of a first gas channel 41, although not particularly limited, may be set to about 0.5 to 20 $mm^2$, for example. Also, the flow channel cross-sectional area of a second gas channel 42 may be set to about 0.1 to 15 $mm^2$, for example.

The flow channel cross-sectional area of the first gas channel 41 refers to the flow channel cross-sectional area of the first gas channel 41 on the cross-section obtained by cutting the first gas channel 41 along a plane (the YZ plane) orthogonal to a direction (the X-axis direction) in which the first gas channel 41 extends. Also, an average value of the flow channel cross-sectional area at any position in the proximal end portion 411 of the first gas channel 41, the flow channel cross-sectional area at any position of the central portion, and the flow channel cross-sectional area at any position in the distal end portion 412 can be used as the flow channel cross-sectional area of the first gas channel 41.

Also, the flow channel cross-sectional area of the second gas channel 42 refers to the flow channel cross-sectional area of the second gas channel 42 on the cross-section obtained by cutting the second gas channel 42 along a plane (the YZ plane) orthogonal to a direction (the X-axis direction) in which the second gas channel 42 extends. Also, an average value of the flow channel cross-sectional area at any position in the proximal end portion 421 of the second gas channel 42, the flow channel cross-sectional area at any position of the central portion, and the flow channel cross-sectional area at any position in the distal end portion 422 can be used as the flow channel cross-sectional area of the second gas channel 42.

Power Generation Element Portion

As shown in FIG. 5, the power generation element portions 5 are supported on a first main surface 45 and a second main surface 46 of the support substrate 4. Note that the number of power generation element portions 5 formed on the first main surface 45 and the number of power generation element portions 5 formed on the second main surface 46 may be the same or different from each other. Also, the power generation element portions 5 may have different sizes.

The power generation element portions 5 are arranged in a direction (the X-axis direction) in which the first and second gas channels 41 and 42 extend. Specifically, the power generation element portions 5 are disposed at intervals from the proximal end portion 43 to the distal end portion 44 on the support substrate 4. That is, the power generation element portions 5 are disposed at intervals in the length direction (the X-axis direction) of the support substrate 4. Note that the power generation element portions 5 are connected to each other in series by electrical connection portions 9, which will be described later.

The power generation element portions 5 each extend in the width direction (the Y-axis direction) of the support substrate 4. The power generation element portion 5 is divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the gas supply chamber 21 and the gas collection chamber 22 can be referred to as a boundary portion between the first portion 51 and the second portion 52.

In the thickness view (the Z-axis view) of the support substrate 4, the first gas channels 41 overlap the first portions 51 of the power generation element portions 5. Thus, fuel gas is supplied mainly from the first gas channels 41 to the first portions 51 of the power generation element portions 5. Also, in the thickness view (the Z-axis view) of the support substrate 4, the second gas channels 42 overlap the second portions 52 of the power generation element portions 5. Thus, fuel gas is supplied mainly from the second gas channels 42 to the second portions 52 of the power generation element portions 5. Note that some of the first gas channels 41 need not overlap the first portions 51. Similarly, some of the second gas channels 42 need not overlap the second portions 52.

Figure 7:
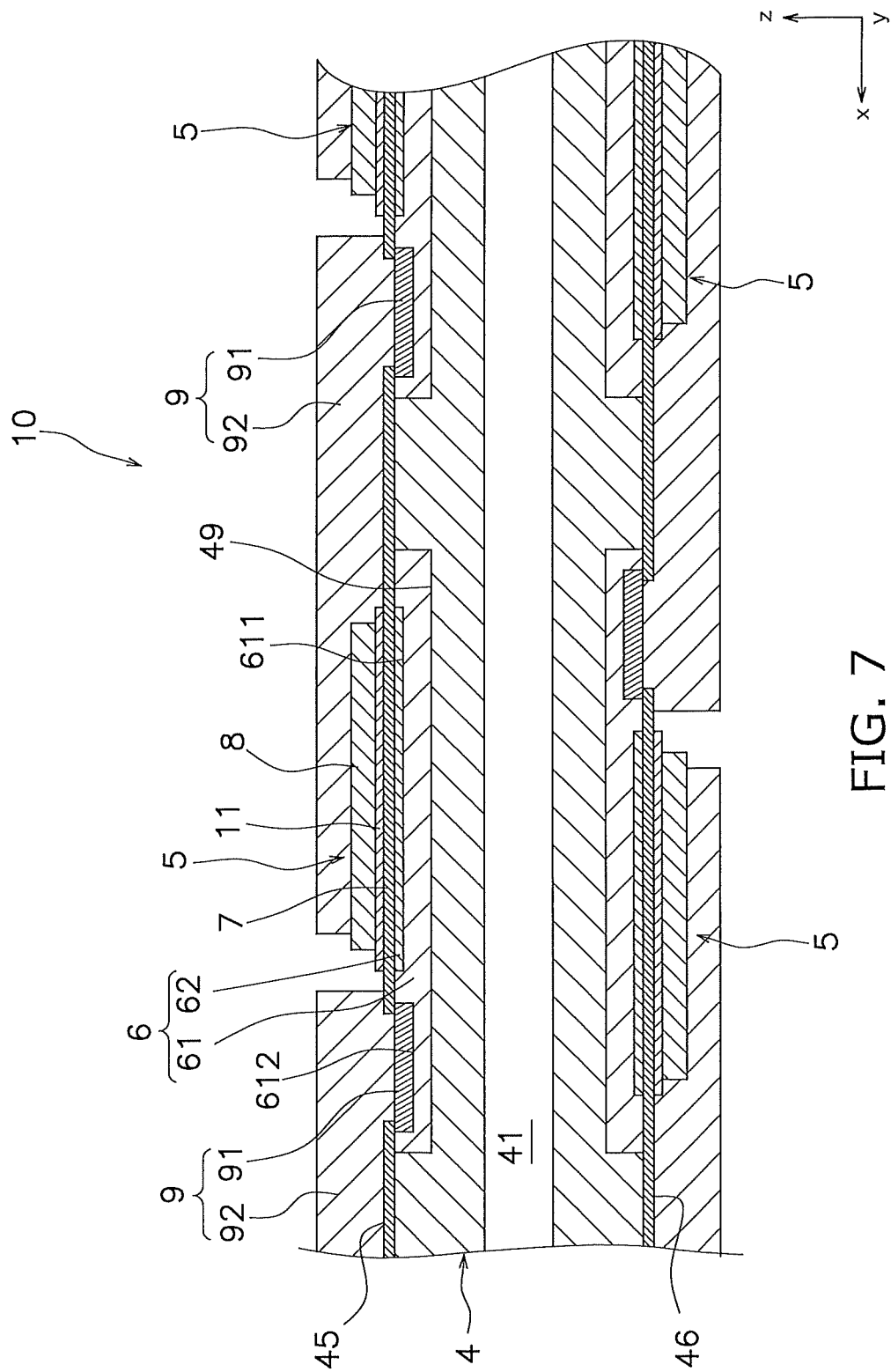
FIG. 7 is a cross-sectional view of the fuel cell.

FIG. 7 is a cross-sectional view of the fuel cell 10 cut along the first gas channel 41. Note that the cross-sectional view of the fuel cell 10 cut along the second gas channel 42 is the same as that in FIG. 7, except that the flow channel cross-sectional area of the second gas channel 42 is different from that in FIG. 7.

The power generation element portions 5 include fuel electrodes 6, the electrolytes 7, and air electrodes 8. Also, the power generation element portions 5 further include reaction preventing films 11. The fuel electrode 6 is a sintered body constituted by a conductive porous material. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61, and the fuel electrode current collector portion 61 has the same outer shape as the recess 49. The fuel electrode current collector portions 61 each have a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 μm and the recess 49 have a depth of about 50 to 500 μm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 μm.

The electrolyte 7 is disposed covering the fuel electrode 6. Specifically, the electrolyte 7 extends in the length direction from one interconnector 91 to another interconnector 91. That is, the electrolytes 7 and the interconnectors 91 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 μm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with large electric resistance is formed at an interface between the electrolyte 7 and the air electrode 8 through a reaction between YSZ in the electrolyte 7 and Sr in the air electrode 8. The reaction preventing film 11 may be constituted by GDC=(Ce, Gd)$O_2$ (gadolinium doped ceria), for example. The reaction preventing film 11 has a thickness of about 3 to 50 μm, for example.

The air electrode 8 is disposed on the reaction preventing film 11. The air electrode 8 is a sintered body constituted by a conductive porous material. The air electrode 8 may be constituted by LSCF=(La, Sr)(Co, Fe)$O_3$ (lanthanum strontium cobalt ferrite), for example. Alternatively, the air electrode 8 may also be constituted by LSF=(La, Sr)FeO$_3$ (lanthanum strontium ferrite), LNF=La(Ni, Fe)O$_3$ (lanthanum nickel ferrite), LSC=(La, Sr)CoO$_3$ (lanthanum strontium cobaltite), or the like. Also, the air electrode 8 may be constituted by two layers of a first layer (inner layer) constituted by LSCF and a second layer (outer layer) constituted by LSC. The air electrode 8 has a thickness of 10 to 100 μm, for example.

Electrical Connection Portion

An electrical connection portion 9 is configured to electrically connect adjacent power generation element portions 5. The electrical connection portion 9 includes an interconnector 91 and an air electrode current collector film 92. The interconnector 91 is disposed in the second recess 612. Specifically, the interconnector 91 is embedded in the second recess 612 (the second recess 612 is filled with the interconnector 91). The interconnector 91 is a sintered body constituted by a conductive compact material. The interconnector 91 is more compact than the support substrate 4. For example, the interconnector 91 has a porosity of about 0% to 7%. The interconnector 91 may be constituted by LaCrO$_3$ (lanthanum chromite), for example. Alternatively, the interconnector 91 may also be constituted by (Sr, La)TiO$_3$ (strontium titanate). The interconnector 91 has a thickness of 10 to 100 µm, for example.

The air electrode current collector film 92 is disposed to extend between the interconnector 91 and the air electrode 8 of adjacent power generation element portions 5. For example, the air electrode current collector film 92 is disposed such that the air electrode 8 of the power generation element portion 5 disposed on the left side in FIG. 7 and the interconnector 91 of the power generation element portion 5 disposed on the right side in FIG. 7 are electrically connected to each other. The air electrode current collector film 92 is a sintered body constituted by a conductive porous material. The air electrode current collector portion 92 may have or need not have oxygen ion conductivity.

The air electrode current collector film 92 may be constituted by LSCF=(La, Sr)(Co, Fe)O$_3$ (lanthanum strontium cobalt ferrite), for example. Alternatively, the air electrode current collector film 92 may also be constituted by LSC=(La, Sr)CoO$_3$ (lanthanum strontium cobaltite). Alternatively, the air electrode current collector film 92 may also be constituted by Ag (silver) or Ag—Pd (a silver palladium alloy). The air electrode current collector film 92 has a thickness of about 50 to 500 µm, for example.

Connection Member

As shown in FIG. 4, the connection member 3 is attached to the distal end portion 44 of the support substrate 4. Also, the connection member 3 includes a connection channel 30 for connecting the first gas channels 41 and the second gas channels 42. Specifically, the connection channel 30 connects the distal end portions 412 of the first gas channels 41 and the distal end portions 422 of the second gas channels 42. The connection channel 30 is constituted by a space extending from the first gas channels 41 to the second gas channels 42. The connection member 3 is preferably joined to the support substrate 4.

The connection member 3 is a porous member, for example. Also, the connection member 3 includes a compact layer 31 constituting the outer surface thereof. The compact layer 31 is more compact than the main body of the connection member 3. For example, the compact layer 31 has a porosity of about 0% to 7%. This compact layer 31 may be made of the same material as the connection member 3, a material used in the above-described electrolyte 7, crystallized glass, or the like.

Method for Generating Power

In the cell stack device 100 configured as described above, fuel gas such as hydrogen gas is supplied to the gas supply chamber 21 of the manifold 2, and the fuel cells 10 are exposed to gas containing oxygen, such as air. Then, a chemical reaction indicated by Equation (1) below occurs in the air electrode 8, a chemical reaction indicated by Equation (2) occurs in the fuel electrode 6, and a current flows.

$$(\tfrac{1}{2}).O_2 + 2e^- \rightarrow O^{2-} \quad (1)$$

$$H_2 + O^{2-} \rightarrow H_2O + 2e^- \quad (2)$$

Specifically, fuel gas supplied to the gas supply chamber 21 flows through the first gas channels 41 of the fuel cells 10, and the chemical reaction indicated by Equation (2) above occurs in the fuel electrodes 6 of the power generation element portions 5. Unreacted fuel gas in the fuel electrodes 6 leaves the first gas channels 41 and is supplied to the second gas channels 42 via the connection channel 30. Then, fuel gas supplied to the second gas channels 42 undergoes the chemical reaction indicated by Equation (2) above in the fuel electrodes 6 again. Unreacted fuel gas in the fuel electrodes 6 in a process in which fuel gas flows through the second gas channels 42 is collected in the gas collection chamber 22 of the manifold 2.

Variations

Although embodiments of the present invention have been described above, the present invention is not limited thereto, and various modifications can be made without departing from the spirit of the present invention.

Variation 1

Although the fuel electrode current collector portion 61 includes the first recess 611 and the second recess 612 in the above-described embodiment, the configuration of the fuel electrode current collector portion 61 is not limited thereto. For example, the fuel electrode current collector portion 61 need not have recesses such as the first recess 611 and the second recess 612. In this case, the fuel electrode active portion 62 and the interconnector 91 are formed on a main surface of the fuel electrode current collector portion 61, and are not embedded in the fuel electrode current collector portion 61.

Variation 2

The first gas channels 41 may have different flow channel cross-sectional areas. Also, the second gas channels 42 may have different flow channel cross-sectional areas.

Variation 3

Figure 8:
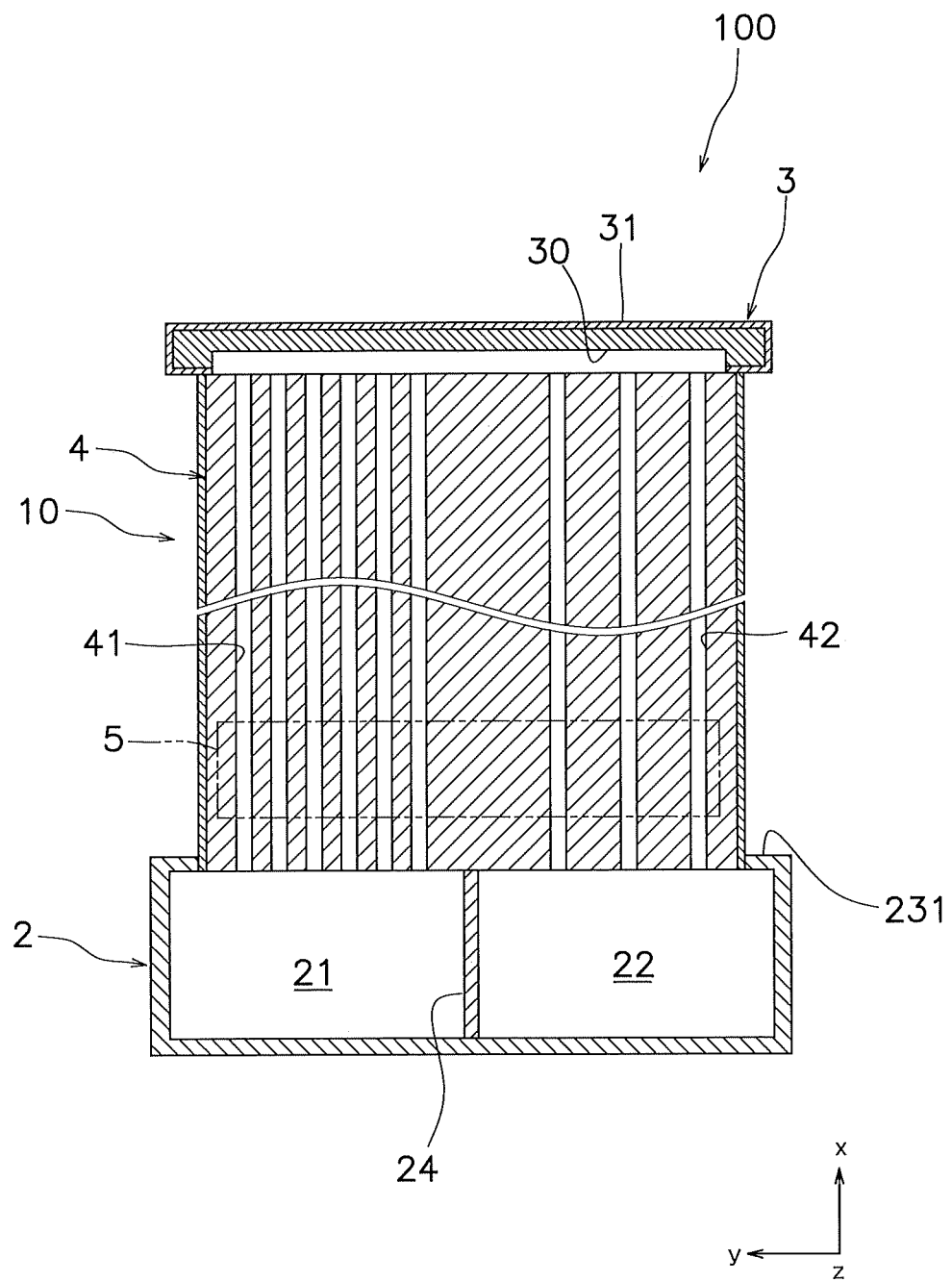
FIG. 8 is a cross-sectional view of a cell stack device according to a variation.

Although the number of second gas channels 42 is the same as the number of first gas channels 41 in the above-described embodiment, the number of second gas channels 42 is not limited thereto. For example, as shown in FIG. 8, the number of second gas channels 42 may be smaller than the number of first gas channels 41. That is, the number of gas channels connected to the gas collection chamber 22 may be smaller than the number of gas channels connected to the gas supply chamber 21. In this case, the flow channel cross-sectional area of a second gas channel 42 may be the same as or larger than the flow channel cross-sectional area of a first gas channel 41 as long as the sum of the flow channel cross-sectional areas of the second gas channels 42 is not larger than the sum of the flow channel cross-sectional areas of the first gas channels 41. Note that, similarly to the above-described embodiment, the flow channel cross-sectional area of a second gas channel 42 may be smaller than the flow channel cross-sectional area of a first gas channel 41. Also, the number of second gas channels 42 may be larger than the number of first gas channels 41 as long as the sum of the flow channel cross-sectional areas of the second gas channels 42 is not larger than the sum of the flow channel cross-sectional areas of the first gas channels 41.

Note that, as a result of expanding the pitch p2 between second gas channels 42, the number of second gas channels 42 is made smaller than the number of first gas channels 41 in the configuration shown in FIG. 8, but in the cell stack device 100, the number of second gas channels 42 may be made smaller than the number of first gas channels 41 with use of another configuration.

Figure 9:
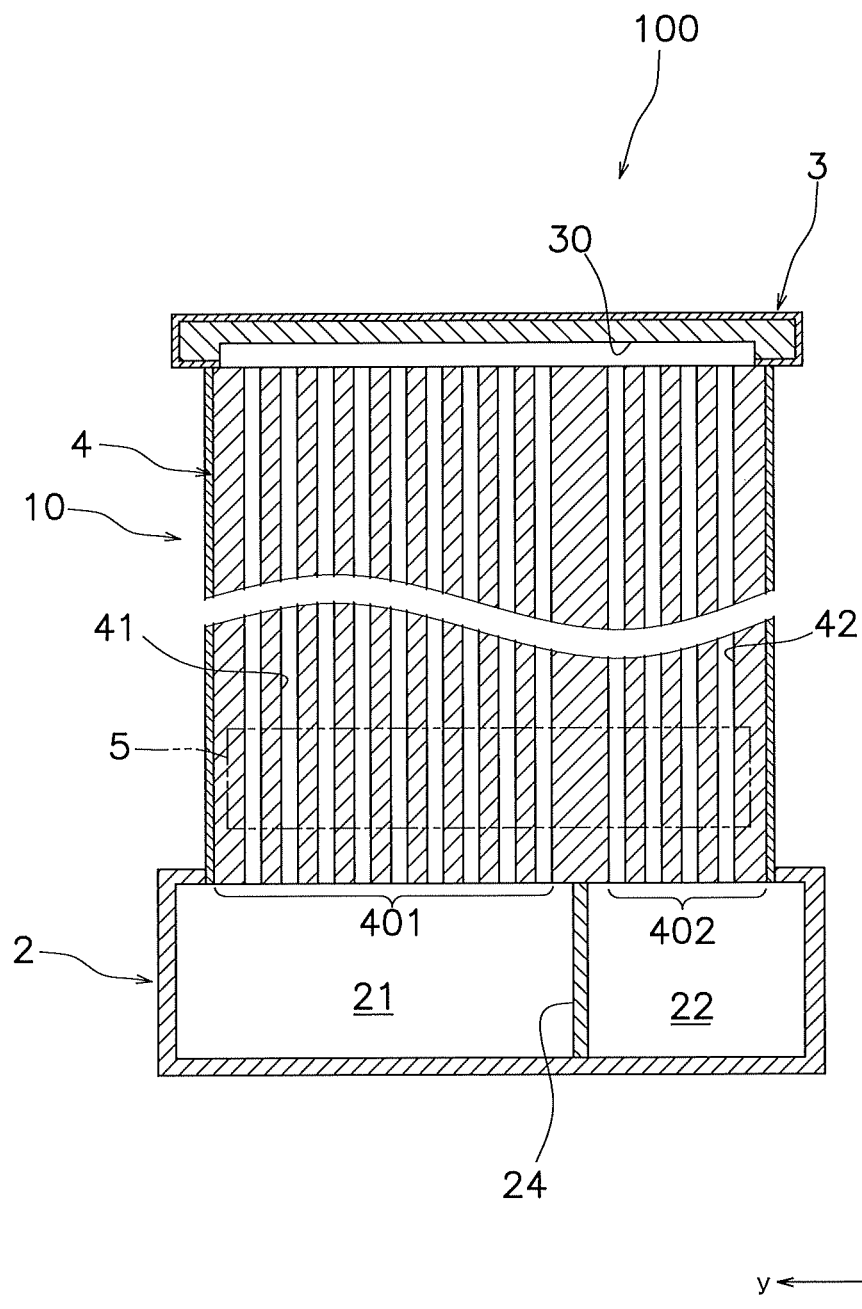
FIG. 9 is a cross-sectional view of a cell stack device according to a variation.

For example, as shown in FIG. 9, the number of second gas channels 42 may be made smaller than the number of first gas channels 41 by making the second region 402 smaller than the first region 401. In this case, the pitch p1 between first gas channels 41 and the pitch p2 between second gas channels 42 are equal to each other. Also, the flow channel cross-sectional area of a first gas channel 41 and the flow channel cross-sectional area of a second gas channel 42 are equal to each other.

The boundary region 403 is closer to the second region 402 in the width direction (the Y-axis direction) with respect to the center of the support substrate 4. Also, the manifold 2 is configured such that the gas collection chamber 22 is smaller than the gas supply chamber 21. For example, as a result of moving the partition plate 24 toward the gas collection chamber 22 with respect to the center thereof, the gas collection chamber 22 can be made smaller than the gas supply chamber 21.

Variation 4

The first gas channel 41 need not have an even flow channel cross-sectional area in its length direction (the X-axis direction). In particular, the flow channel cross-sectional area of the first gas channel 41 may become smaller toward the distal end portion 412 where the concentration of fuel gas is low. Also, the second gas channel 42 need not have an even flow channel cross-sectional area in the length direction (the X-axis direction). In particular, the flow channel cross-sectional area of the second gas channel 42 may become smaller toward the proximal end portion 421 where the concentration of fuel gas is low. This configuration makes it possible to further keep Ni whose diffusibility is increased and that is present in the vicinity of the interface from changing into NiO.

Variation 5

Although the first and second gas channels 41 and 42 have a circular cross-section in the above-described embodiment, the cross-sectional shape of the first and second gas channels 41 and 42 may be a rectangle or an eclipse.

Variation 6

The fuel cell 10 includes a plurality of first gas channels 41 in the above-described embodiment, but may include only one first gas channel 41. In this case, the sum of the flow channel cross-sectional areas of the first gas channels 41 refers to the cross-sectional area of one first gas channel 41. Similarly, the fuel cell 10 includes a plurality of second gas channels 42, but may include only one second gas channel 42. In this case, the sum of the cross-sectional areas of the second gas channels 42 refers to the cross-sectional area of one second gas channel 42.

Variation 7

Although the power generation element portions 5 disposed on the first main surface 45 are connected to each other in series in the above-described embodiment, it is not necessary for all the power generation element portions 5 disposed on the first main surface 45 to be connected to each other in series. Note that the same applies to the power generation element portions 5 disposed on the second main surface 46.

Variation 8

In the fuel cell 10, spaces between the power generation element portions 5 formed on the first main surface 45 and the power generation element portions 5 formed on the second main surface 46 need not be electrically connected to each other, or may be electrically connected to each other at a plurality of portions.

Variation 9

The power generation element portions 5 are disposed on both the first main surface 45 and the second main surface 46 in the above-described embodiment, but may be disposed on only one of the first main surface 45 and the second main surface 46.

Variation 10

The fuel cells 10 may have different widths. Specifically, the power generation element portions 5 may have different widths. For example, the width of each power generation element portion 5 formed on a given support substrate 4 may be different from the width of each power generation element portion 5 formed on another support substrate 4.

Variation 11

Although the connection member 3 is a porous member in an embodiment, the connection member 3 may be constituted by metal. Specifically, the connection member 3 can be constituted by an Fe—Cr alloy, a Ni-based alloy, MgO-based ceramic material (may be the same material as the support substrate 4), or the like.

Variation 12

Figure 10:
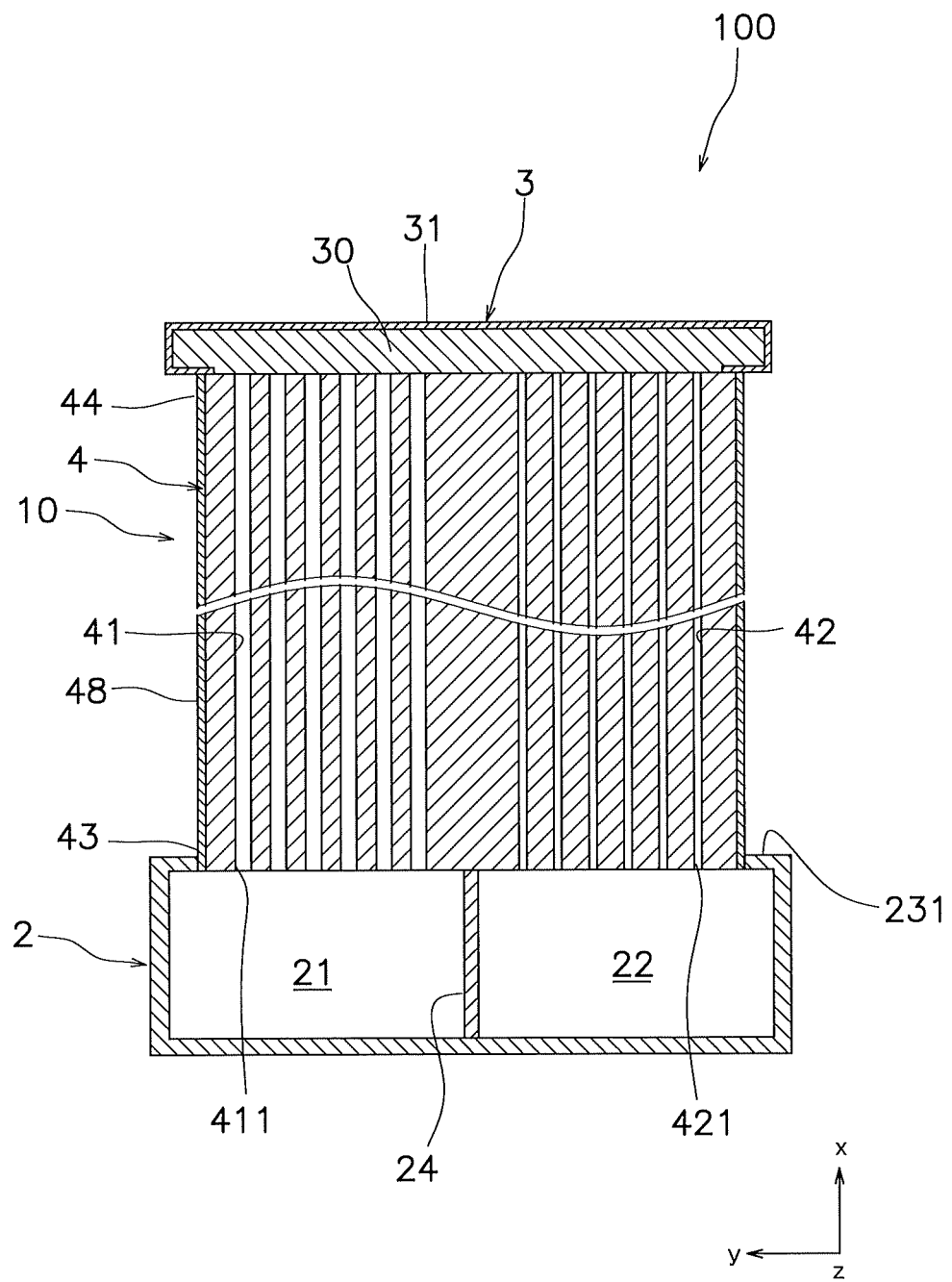
FIG. 10 is a cross-sectional view of a cell stack device according to a variation.

Although the connection channel 30 of the connection member 3 is constituted by a space in the above-described embodiment, the configuration of the connection channel 30 of the connection member 3 is not limited thereto. For example, as shown in FIG. 10, the connection channel 30 of the connection member 3 can be constituted by a plurality of pores formed in the connection member 3.

Variation 13

Figure 11:
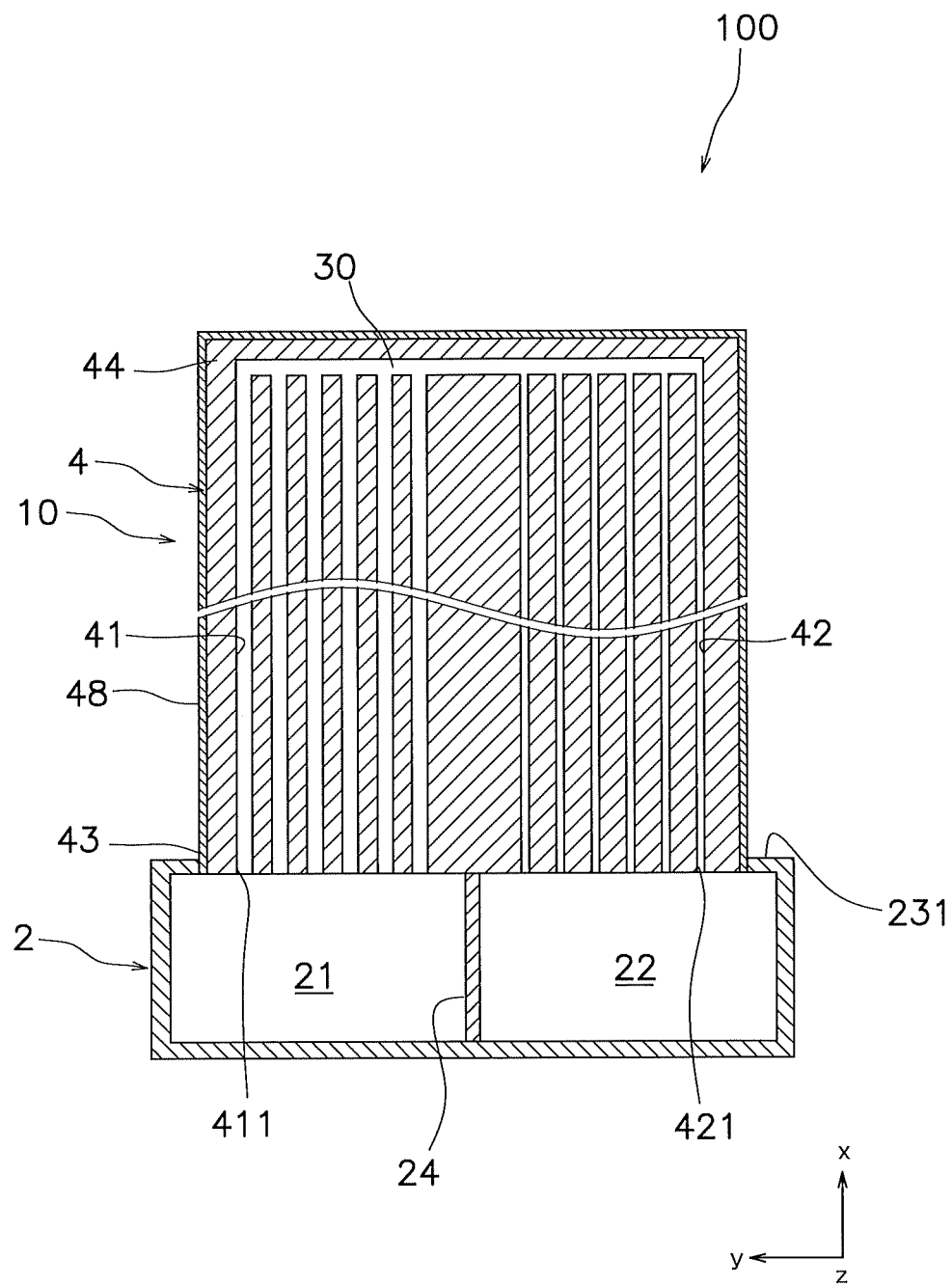
FIG. 11 is a cross-sectional view of a cell stack device according to a variation.

As shown in FIG. 11, the cell stack device 100 need not include the connection member 3. In this case, the connection channel 30 may be formed in the support substrate 4, for example. The connection channel 30 extends in the width direction (the Y-axis direction) in the distal end portion 44 of the support substrate 4.

Variation 14

Although as a result of partitioning one manifold main body 23 with use of the partition plate 24, the gas supply chamber 21 and the gas collection chamber 22 are defined in the manifold 2 of the above-described embodiment, the configuration of the manifold 2 is not limited thereto. For example, the manifold 2 can also be constituted by two manifold main bodies 23. In this case, one manifold main body 23 includes the gas supply chamber 21, and another manifold main body 23 includes the gas collection chamber 22.

Variation 15

Although the fuel cells 10 of the above-described embodiment are so-called horizontal-stripe type fuel cells in which the power generation element portions 5 are arranged in the length direction (the X-axis direction) of the support substrate 4, the configuration of the fuel cells 10 is not limited thereto. For example, the fuel cells 10 may be so-called vertical-stripe type fuel cells in which one power generation element portion 5 is supported on the first main surface 45 of the support substrate 4. In this case, one power generation element portion 5 may be or need not be supported on the second main surface 46 of the support substrate 4.

EXAMPLES

Hereinafter, the present invention will be more specifically described with use of examples and comparative examples. Note that the present invention is not limited to the examples below.

In a cell stack device 100 having a configuration as shown in FIG. 9, Sample No. 1 to Sample No. 8 were produced by changing, as shown in Table 1, a ratio (S1/S2) of the sum (S1) of the flow channel cross-sectional areas of the first gas channels 41 to the sum (S2) of the flow channel cross-sectional areas of the second gas channels 42. In Sample No. 1 to Sample No. 8, conditions other than the sum (S1) of the flow channel cross-sectional areas of the first gas channels 41 and the sum (S2) of the flow channel cross-sectional areas of the second gas channels 42 were basically the same.

Evaluation Method

A continuous power generation test was performed on the fuel cells 10 of Sample No. 1 to Sample No. 8 produced in a manner described above. Then, a decrease in the power generation efficiency in the power generation element portions 5 was evaluated after 1000 hours had passed from when the continuous power generation test was started. Note that a rate of change in the average output voltage of fuel cells operated when the power generation temperature was 750° C., the current density was 0.15 A/cm$^2$, and the fuel utilization rate was 90% was evaluated based on an average output voltage immediately after the test was started.

TABLE 1

| No. | S1/S2 | Rate of change in average output voltage after 1000 hours of continuous operation (%) |
|---|---|---|
| 1 | 1.00 | 0.45 |
| 2 | 1.02 | 0.39 |
| 3 | 1.05 | 0.15 |
| 4 | 1.15 | 0.12 |
| 5 | 1.35 | 0.18 |
| 6 | 1.56 | 0.13 |
| 7 | 1.82 | 0.14 |
| 8 | 2.00 | 0.15 |

As shown in Table 1, it was found that, as a result of making the sum (S1) of the flow channel cross-sectional areas of the first gas channels 41 larger than the sum (S2) of the flow channel cross-sectional areas of the second gas channels, it is possible to inhibit the power generation efficiency from decreasing. Also, it was found that, as a result of setting, to 1.05 or more, the ratio (S1/S2) of the sum (S1) of the flow channel cross-sectional areas of the first gas channels 41 to the sum (S2) of the flow channel cross-sectional areas of the second gas channels 42, it is possible to further inhibit the power generation efficiency from decreasing. It is conceivable that the reason why power generation efficiency can be kept from decreasing in this manner is that, as a result of making the sum (S1) of the flow channel cross-sectional areas of the first gas channels 41 larger than the sum (S2) of the flow channel cross-sectional areas of the second gas channels, so-called fuel exhaustion is inhibited.

The invention claimed is:

1. A fuel cell including a distal end portion and a proximal end portion, the fuel cell comprising:
   a support substrate constituted by a porous material having no electron conductivity;
   at least one power generation element portion that is disposed on the support substrate;
   a plurality of first gas channels that extend from the proximal end portion to the distal end portion in the support substrate; and
   at least one second gas channel that extends from the proximal end portion to the distal end portion in the support substrate, and is connected to the first gas channels in the distal end portion,
   wherein the first gas channels and the at least one second gas channel are configured such that a pressure loss of gas in the first gas channels is smaller than a pressure loss of gas in the at least one second gas channel,
   a pitch between a first gas channel and a second gas channel that are adjacent to each other is larger than a pitch between first gas channels that are adjacent to each other,
   a ratio (S1/S2) of the sum (S1) of the flow channel cross-sectional area of the first gas channels to the sum (S2) of the flow channel cross-sectional area of the at least one second gas channel is 1.05 or more,
   and only the support substrate is provided between the plurality of first gas channels and the at least one second gas channel.

2. The fuel cell according to claim 1,
   wherein the sum of a flow channel cross-sectional area of the first gas channels is larger than the sum of a flow channel cross-sectional area of the at least one second gas channel.

3. The fuel cell according to claim 1,
   wherein the number of first gas channels is larger than the number of second gas channels.

4. The fuel cell according to claim 1,
   wherein the fuel cell comprises a plurality of the second gas channels,
   the flow channel cross-sectional areas of the first gas channels and the flow channel cross-sectional areas of the second gas channels are equal to each other, and
   a pitch between the first gas channels and a pitch between the second gas channels are equal to each other.

5. The fuel cell according to claim 1, further comprising a connection channel for connecting the first gas channels and the at least one second gas channel in the distal end portion of the fuel cell.

6. The fuel cell according to claim 5,
   wherein the support substrate includes the connection channel therein.

7. The fuel cell according to claim 5, further comprising a connection member that is attached to a distal end portion of the support substrate,
   wherein the connection member includes the connection channel therein.

8. The fuel cell according to claim 1,
   wherein the at least one power generation element portion includes a plurality of power generation element portions, and
   the power generation element portions are arranged in a direction in which the first and second gas channels extend.

9. The fuel cell according to claim 1,
   wherein the power generation element portion extends in a width direction of the support substrate,
   the power generation element portion is divided into a first portion and a second portion in the width direction of the support substrate,
   the first gas channels overlap the first portion of the power generation element portion in a thickness view of the support substrate, and
   the at least one second gas channel overlaps the second portion of the power generation element portion in the thickness view of the support substrate.

10. A cell stack device comprising:
    the fuel cell according to claim 1; and
    a manifold including a gas supply chamber and a gas collection chamber, the manifold supporting the proximal end portion of the fuel cell,
    wherein the first gas channels are connected to the gas supply chamber, and
    the at least one second gas channel is connected to the gas collection chamber.

11. A cell stack device comprising:
a manifold including a gas supply chamber and a gas collection chamber; and
a fuel cell including a support substrate constituted by a porous material having no electron conductivity and at least one power generation element portion, the support substrate extending from the manifold in a first direction, the power generation element portion being supported by the support substrate,
wherein the support substrate includes a plurality of first gas channels and at least one second gas channel, the first gas channels extending in the first direction and being connected to the gas supply chamber, the at least one second gas channel extending in the first direction and being connected to the gas collection chamber,
the first gas channels and the at least one second gas channel each include a proximal end portion located on the manifold side and a distal end portion that is opposite the proximal end portion,
the first gas channels are open in the gas supply chamber at the proximal end portion,
the at least one second gas channel is open in the gas collection chamber at the proximal end portion,
the first gas channels and the at least one second gas channel are connected to each other on the distal end portion side,
the first gas channels and the at least one second gas channel are configured such that a pressure loss of gas in the first gas channels is smaller than a pressure loss of gas in the at least one second gas channel,
a pitch between a first gas channel and a second gas channel that are adjacent to each other is larger than a pitch between first gas channels that are adjacent to each other,
a ratio (S1/S2) of the sum (S1) of the flow channel cross-sectional area of the first gas channels to the sum (S2) of the flow channel cross-sectional area of the at least one second gas channel is 1.05 or more,
and only the support substrate is provided between the plurality of first gas channels and the at least one second gas channel.

* * * * *